(12) United States Patent
Indersie et al.

(10) Patent No.: US 8,153,317 B2
(45) Date of Patent: Apr. 10, 2012

(54) PREHEATING HEAT EXCHANGER FOR A FUEL CELL

(75) Inventors: Dominique Indersie, Vernon (FR); Come Loevenbruck, Vernon (FR)

(73) Assignee: SNECMA, Paris (FR)

( * ) Notice: Subject to any disclaimer, the term of this patent is extended or adjusted under 35 U.S.C. 154(b) by 785 days.

(21) Appl. No.: 12/286,473

(22) Filed: Sep. 30, 2008

(65) Prior Publication Data
US 2009/0087707 A1 Apr. 2, 2009

(30) Foreign Application Priority Data
Oct. 1, 2007 (FR) .................................... 07 57975

(51) Int. Cl.
*H01M 8/04* (2006.01)
(52) U.S. Cl. ........................................ 429/434; 165/157
(58) Field of Classification Search .................. 165/140, 165/141, 156–160, 169, 170; 429/434, 436, 429/440
See application file for complete search history.

(56) References Cited

U.S. PATENT DOCUMENTS

| | | | |
|---|---|---|---|
| 3,732,920 A * | 5/1973 | Kimmel ........................ 165/119 |
| 4,096,616 A | 6/1978 | Coffinberry | |
| 4,220,200 A * | 9/1980 | Weber ........................... 165/142 |
| 4,235,283 A * | 11/1980 | Gupta .......................... 165/80.4 |
| 4,494,484 A * | 1/1985 | Ruzek ............................. 122/34 |
| 4,700,772 A * | 10/1987 | Baumberger ................. 165/103 |
| 4,747,447 A * | 5/1988 | Scanlan et al. ........... 165/104.34 |
| 5,542,467 A * | 8/1996 | Carpentier ...................... 165/70 |
| 5,649,589 A * | 7/1997 | Carpentier ...................... 165/70 |
| 6,982,066 B2 * | 1/2006 | Filippi et al. .................. 422/198 |
| 2004/0089438 A1 | 5/2004 | Valensa et al. | |

FOREIGN PATENT DOCUMENTS
DE 4402466 8/1995
* cited by examiner

*Primary Examiner* — Thanh Tam Le
(74) *Attorney, Agent, or Firm* — Weingarten, Schurgin, Gagnebin & Lebovici LLP (57) ABSTRACT

The invention relates to a heat exchanger for a hot fuel cell. The heat exchanger includes a first flow circuit for receiving a cool air stream and a second flow circuit for receiving a hot fluid coming from the cell, the first and second flow circuits having common surfaces for heat exchange. In accordance with the present invention, each of the first and second flow circuits comprises a plurality of concentric annular ducts that are interconnected. The two walls of each duct are mechanically decoupled from each other, thereby enabling them to expand independently of one another and avoiding mechanical stresses within the heat exchanger.

7 Claims, 6 Drawing Sheets

PREHEATING HEAT EXCHANGER FOR A FUEL CELL

FIELD OF THE INVENTION

The present invention relates to the field of heat exchangers enabling a first fluid to be heated by exchanging heat with a second fluid. More particularly, the invention relates to high-temperature heat exchangers used with fuel cells.

BACKGROUND OF THE INVENTION

Solid oxide fuel cells, commonly written SOFC, implement an electrochemical redox reaction with simultaneous production of electricity. One of the electrodes of the cell needs to be fed with a fuel, generally hydrogen, and the other with an oxidizer, namely oxygen. In practice, the cell is fed with oxygen by feeding a stream of air into the core of the cell.

An SOFC has an operating temperature that is high, of the order of 900° C. to 1000° C. However the air used for feeding oxygen to the cell must be preheated to a temperature that is relatively close to the operating temperature of the cell prior to being fed thereto.

A heat exchanger is used in association with the fuel cell proper for the purpose of preheating air before it is fed into the core of the cell. A large number of heat exchangers are presently available that operate at temperatures that are relatively low. However heat exchangers involving gas at very high temperatures, in the vicinity of 900° C., are not very numerous. High-temperature heat exchangers for SOFCs are described in particular in documents U.S. 2005/0249991 and U.S. 2005/0089731. However most of the component elements those heat exchangers expand to a large extent under the effect of high temperatures. Those thermal expansions, which are also non-uniform because of the presence of temperature gradients between the inlets and the outlets of the heat exchange circuits, give rise to major mechanical stresses between parts and over the heat-exchange structure as a whole, and that can lead to irreversible deformation. In order to avoid excessive thermal expansion, a first solution consists in using materials that present small coefficients of thermal expansion (e.g. ceramic materials). Nevertheless, those materials are expensive to fabricate. Another solution for mitigating thermal expansion problems consists in proposing special heat exchanger designs that are relatively complex in terms of fabrication and operation. In addition, in the designs that have been proposed up till now, heat exchange between the stream of air for preheating and the source of heat is not optimized, in particular because of the presence of heat loss zones that lead to parasitic heat exchange within the heat exchanger.

OBJECT AND SUMMARY OF THE INVENTION

An object of the present invention is to provide a high temperature heat exchanger structure, in particular for a fuel cell, of a design that serves to limit mechanical stresses due to thermal expansion while using standard materials such as metal materials. The present invention also seeks to provide a heat exchanger structure that is simple to make, presenting a lifetime that is long, and in which heat exchange is optimized.

To this end, the invention provides a heat exchanger comprising a first flow circuit for receiving a cold fluid and a second flow circuit for receiving a hot fluid, the first and second flow circuits having common surfaces for heat exchange, wherein each of the first and second flow circuits comprises a plurality of interconnected concentric annular ducts, and wherein the two walls of each duct are mechanically decoupled from each other.

Thus, by mechanically decoupling the walls of each duct of the heat exchanger, the walls can expand independently of one another, thereby enabling mechanical stresses in the heat exchanger to be avoided. By minimizing mechanical forces in the heat exchanger while it is in operation, its lifetime is lengthened and deformation of its structure is avoided.

Furthermore, because of the mechanical decoupling between the walls of the ducts for the purpose of limiting the consequences of thermal expansion within the heat exchanger, there is no longer any need to use expensive materials presenting a small coefficient of thermal expansion. The heat exchanger of the invention can thus be fabricated using standard materials such as metal materials that enable the heat exchanger to be made using forming technologies (folding, curving, etc.) and assembly technologies (welding, bolting, etc.) that are simple and inexpensive.

In an aspect of the invention, one of the two walls of each duct has a free end, said wall being free to expand in particular in the axial direction without exerting mechanical stresses on other parts of the heat exchanger.

In another aspect of the invention, the heat exchanger presents in the radial direction an alternating succession of pairs of adjacent annular ducts belonging to the first flow circuit for the cold fluid and pairs of adjacent annular ducts belonging to the second flow circuit for the hot fluid, two adjacent annular ducts forming a distribution baffle for the cold fluid or the hot fluid. This disposition of the annular duct enables the cold fluid and the hot fluid to be distributed in each flow circuit of the heat exchanger merely by going round the end of the baffle, and without using additional distribution means that would make the design of the heat exchanger more complex and would prevent heat exchange being optimized. With this design, it is also possible to make a heat exchanger that is compact and capable of being incorporated easily in housings of small dimensions.

In a particular embodiment, at least one side of each wall common to two adjacent ducts belonging to said first or to said second flow circuit includes a layer of thermal insulation. By insulating all or some of the baffles formed by pairs of adjacent ducts, potential parasitic heat exchange within the same fluid is avoided, thereby making it possible to avoid thermal blockages and further encouraging heat exchange between the hot fluid and the cold fluid in the heat exchanger.

The heat exchanger may further include spacer studs disposed between the walls of the annular ducts of the first and second flow circuits.

In a particular embodiment, the heat exchanger further includes a first layer of thermal insulation material placed around the outer periphery of said heat exchanger and a second layer of thermal insulation material placed on the top portion of said heat exchanger.

In another particular embodiment, the heat exchanger further includes a first duct extending over the entire outer periphery of said heat exchanger, and a second duct extending substantially over the top portion of said heat exchanger so as to form a cooling circuit around said heat exchanger. Under such circumstances, the portion of the cooling circuit situated close to the top portion of the heat exchanger is thermally decoupled by means of a layer of thermal insulation.

The performance of the heat exchanger of the invention can easily be adapted as a function of the desired level of heat exchange. The lengths of the first and second flow circuits and consequently the areas of the heat exchange surfaces depend on the numbers and/or the heights of the annular ducts.

The present invention also provides a fuel cell device comprising a solid oxide fuel cell and further comprising a heat exchanger as described above, said heat exchanger including a central recess in which said cell is placed, the first flow circuit of said heat exchanger being suitable for feeding the fuel cell with a flow of preheated cool air, and the second flow circuit of said heat exchanger being suitable for exhausting a flow of hot depleted air coming from the fuel cell, the cool air stream being preheated by exchanging heat with the depleted air stream in said heat exchanger.

This provides a fuel cell device with a heat exchanger disposed concentrically about the solid oxide fuel cell, the hottest portion of the heat exchanger, i.e. the portion having the hot depleted air stream coming from the cell fed thereto, being at the center, while the coolest portion, i.e. the portion receiving the cool air stream for preheating, lies at the outer periphery of the heat exchanger. The heat exchanger thus also provides first thermal insulation between the fuel cell and the outside.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS OF THE INVENTION

Figure 1:
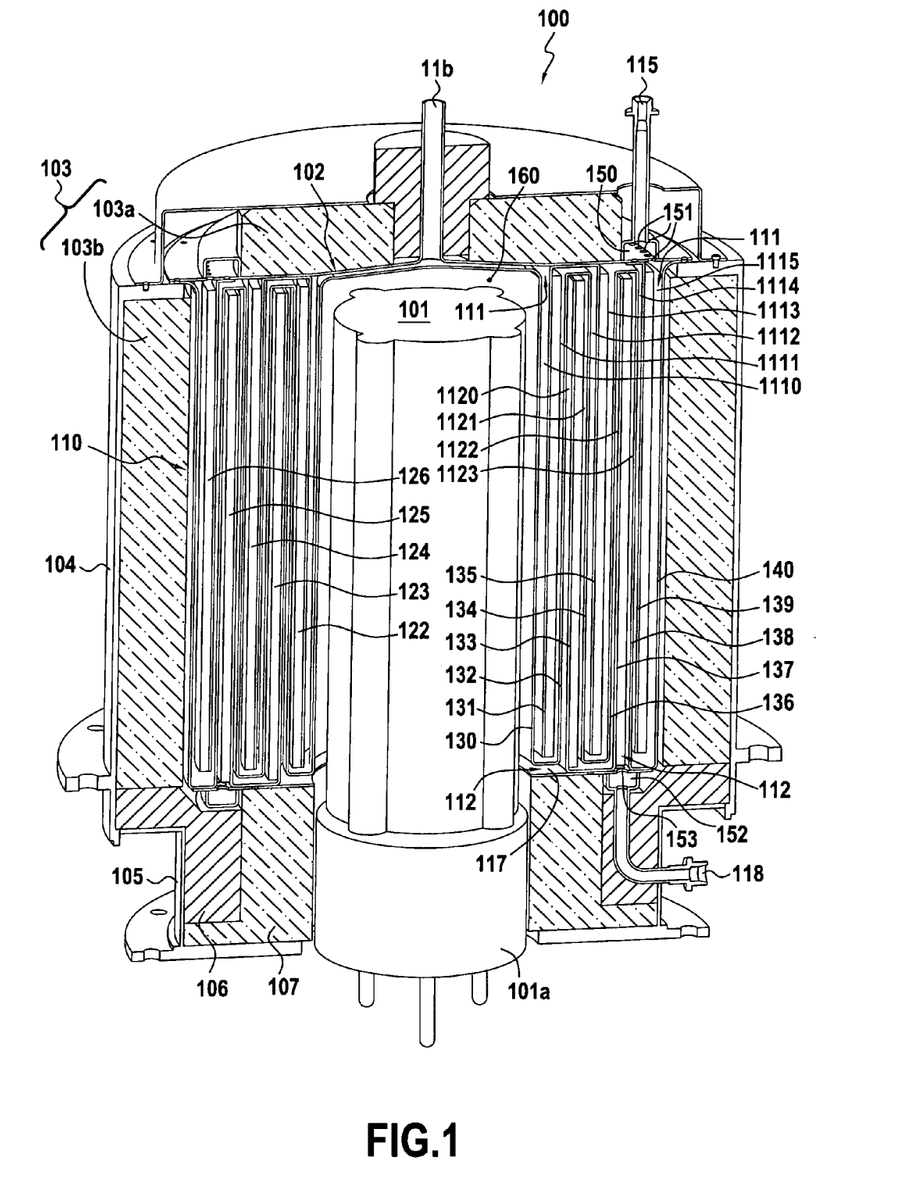
FIG. 1 is a diagrammatic perspective view in section of an embodiment of a fuel cell device incorporating a heat exchanger in accordance with the invention.

FIG. 1 shows a fuel cell device 100 incorporating a heat exchanger 110 in accordance with an embodiment of the invention.

The device 100 comprises a fuel cell 101 of the solid oxide type, commonly written SOFC (for "solid oxide fuel cell"). The structure and the operation of fuel cells of this type are well known and are not described in greater detail in order to simplify the present description. Independently of the internal structure of the SOFC used, the dimensioning of the heat exchanger of the invention, both geometrically and thermally, is defined as a function of the outside dimensions of the cell for incorporation therein and on the temperature of the cell itself, and above all of the hot depleted air exhausted by the cell. The hot depleted air inside the cell is exhausted around the cell, i.e. into the space present between the outside surface of the cell and the inside surface of the heat exchanger.

The operating temperature of a SOFC lies around 900° C. The air flow used for feeding the cell must consequently be heated prior to being fed into the cell. For this purpose and, in accordance with the present invention, the fuel cell device 100 comprises a heat exchanger 110 that serves to preheat the air that is to be fed to the cell up to a temperature close to the operating temperature of the cell, e.g. about 700° C.

Figure 3:
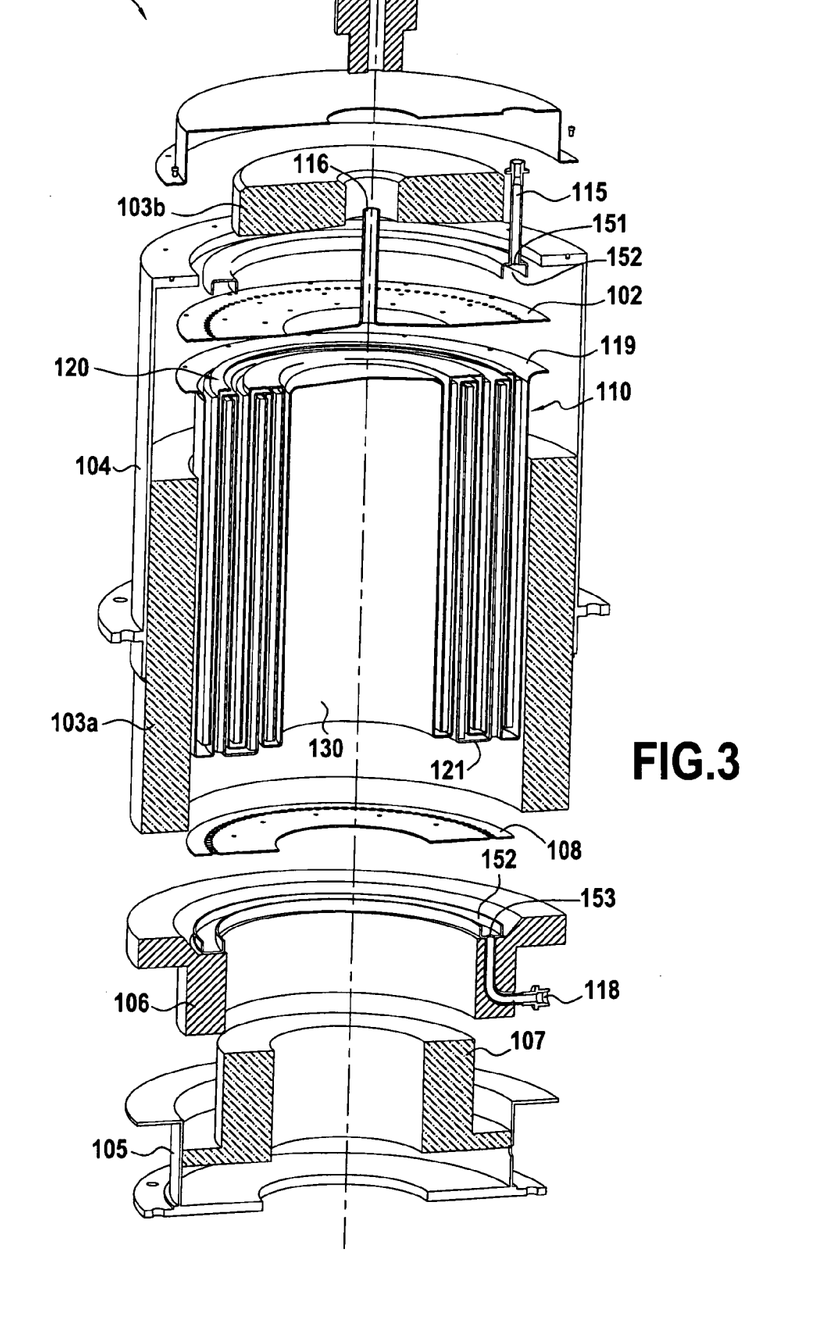
FIG. 3 is an exploded perspective view showing the component elements of the FIG. 1 fuel cell device.

As shown in FIGS. 1 and 3, the top portion of the heat exchanger is closed by a cover plate 102. In the embodiment described here, thermal insulation between the fuel cell device and the outside is provided by an insulating cover 103 comprising a first layer of a thermal insulation material 103a placed between a structural casing 104 and the heat exchanger 110, and by a second layer of thermal insulation material 103b placed on the top portion of the heat exchanger in such a manner as to protect a user from the potential risk of burns in contact with the device. The structural casing 104 that serves to hold the insulating layer 103 in place and to protect the device against external impacts is fastened to a base 105 used for fastening the device to a support. The empty inside volume in the support 105 around the fuel cell 101 is filled with thermal insulation 106 and 107.

Figure 4:
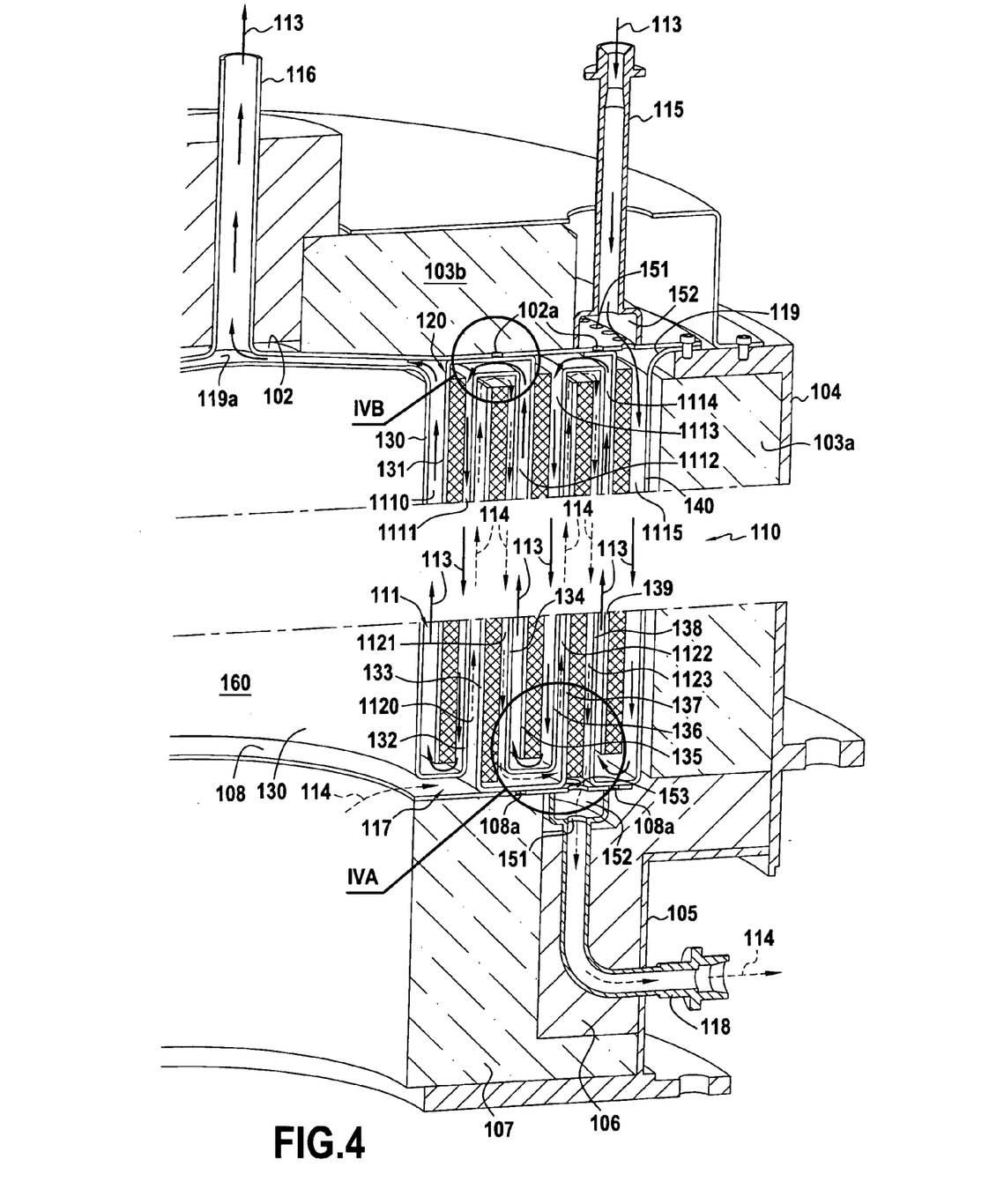
FIG. 4 is a diagrammatic half-section view of the fuel cell device of FIG. 1.

As shown in FIGS. 1 and 4, the heat exchanger 110 is generally substantially in the form of a cylinder with a central recess 160 forming a housing for the fuel cell 101. The bottom 101a of the fuel cell 101 provides sealing, e.g. by means of a system of gaskets (not shown), which sealing is provided between the recess 160 and the outside of the heat exchanger, so as to channel the hot air exhausted by the cell into the flow duct 112 of the heat exchanger.

The heat exchanger 110 comprises a plurality of circular walls 130 to 140 disposed concentrically so as to define two separate flow circuits 111 and 112. The first flow circuit 111 serves to preheat the stream of cool air 113 that is to feed oxygen to the cell, and it is made up of a plurality of concentric annular ducts 1110 to 1115. The annular ducts 1110 to 1115 are connected in series alternately via their bottom portions and via their top portions so as to define an optimum flow path for the cool air stream through the heat exchanger between a cool air inlet 115 and a preheated cool air outlet 116. The cool air stream fed into the heat exchanger via the cool air inlet 115 is distributed annularly in the duct 1115 by means of an annular groove 150 and via perforations 151 formed in the cover plate 102 and distributed along the entire length of the groove. The preheated air collected from the preheated cool air outlet 116 is subsequently fed into the fuel cell 101 via a specific circuit (not shown in FIG. 1).

The second flow circuit 112 serves to cool the depleted air stream 114 coming from the fuel cell 101 by heat exchange with the cool air stream 113. The second flow circuit 112 is made up of a plurality of concentric annular ducts 1120 to 1123. The annular ducts 1120 to 1123 are connected in series alternately via their bottom portions and via their top portions between an inlet for depleted air 117 coming from the cell and an outlet for depleted air 118 leaving the heat exchanger 110. The depleted air stream 114 coming from the cell is fed annularly into the heat exchanger via the depleted air inlet 117 that is situated in the bottom portion of the duct 110. The depleted air stream is then discharged from the heat exchanger likewise annularly from the duct 1123 via an annular groove 152 co-operating with the depleted air outlet 118 and the duct 1123 via perforations 153 formed in an annular plate 108 and distributed all along the groove. The cooled depleted air collected at the depleted air outlet 118 is used for operating a boiler (not shown in FIG. 1).

Although the heat exchanger shown in FIGS. 1 and 4 has six ducts for the cool air stream and four ducts for the depleted air stream, the heat exchanger of the invention is not limited in any way to these numbers of ducts. Depending on requirements in terms of heat exchange, the person skilled in the art will have no difficulty in adapting (increasing or reducing) the numbers of ducts required for the intended exchange of heat.

In accordance with the present invention, the walls of each annular duct 1110 to 1115 and 1120 to 1123 are mechanically decoupled. For example, the annular duct 1110 is defined by two walls 130 and 131 that belong respectively to two mechanically independent parts. Similarly, the duct 1120 is defined by two walls 132 and 133 that are mechanically decoupled. The same applies to all the other ducts of the heat exchanger.

Figure 2:
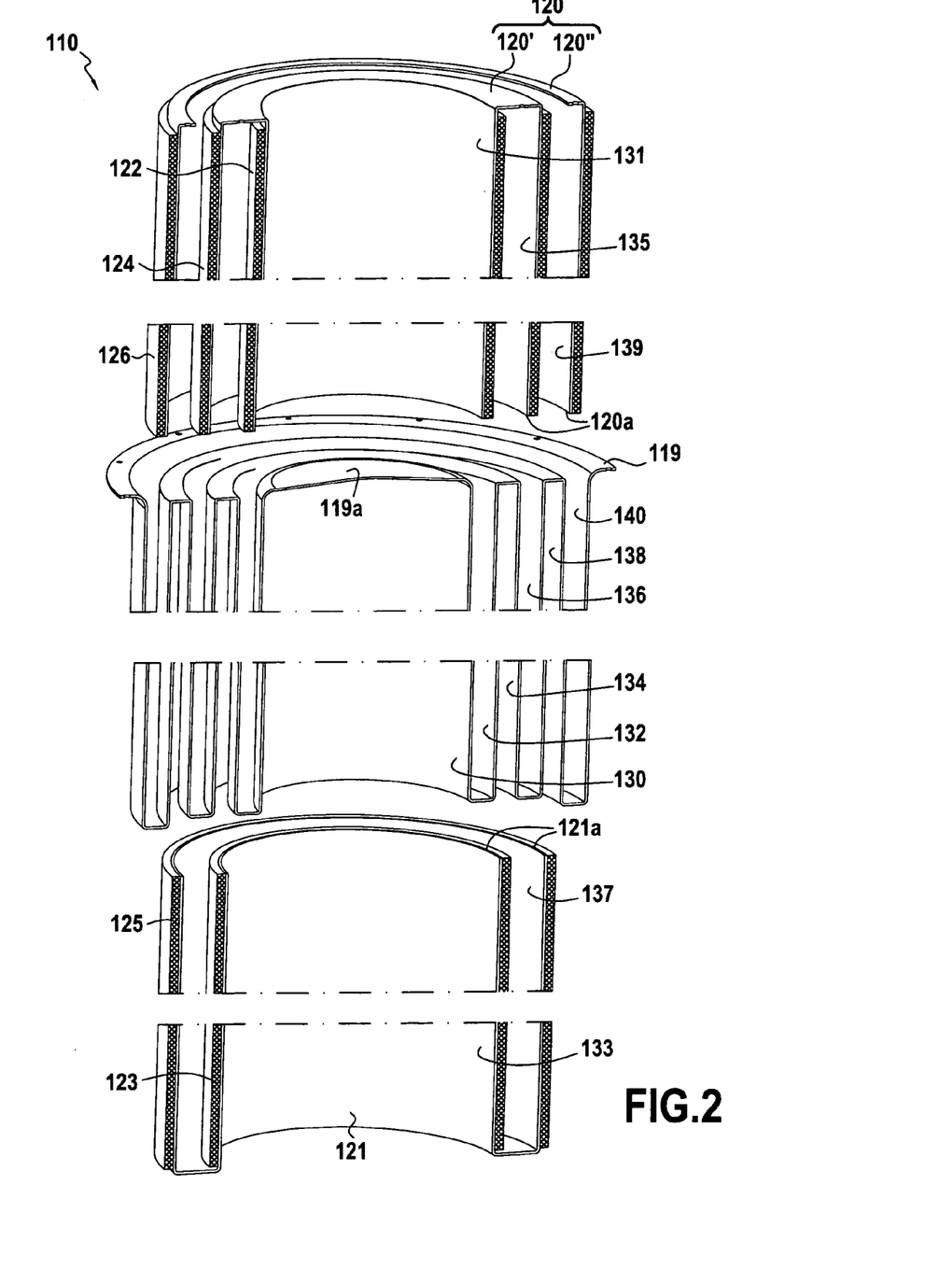
FIG. 2 is an exploded perspective view showing the component elements of the FIG. 1 heat exchanger.

In the embodiment shown in FIG. 1, the ducts 1110 to 1115 and 1120 to 1123 are made by interfitting three annular parts 119, 120, and 121, as shown in FIG. 2. The parts 119, 120, and 121 are made by folding and curving sheets of metal material, e.g. of Inconel® 625. The part 120, which is constituted by two sub-elements 120' and 120", has three concentric annular vertical walls for interfitting in the part 119 so as to constitute the walls 131, 135, and 139 of the heat exchanger. Similarly, the part 121 has two concentric annular vertical walls for interfitting in the part 119 to constitute the walls 133 and 137 of the heat exchanger.

When interfitted in the part 119, the part 120 forms obstacles for the depleted air stream 114 coming from the fuel cell flowing between the depleted air inlet 117 and the depleted air outlet 118. Similarly, once interfitting in the part 119, the part 121 forms obstacles that the cool air stream 113 needs to flow around on passing between the cool air inlet 115 and the preheated cool air outlet 116. Since the parts 119, 120, and 121 are not connected to one another, all of the walls of the heat exchanger that are adjacent in pairs are mechanically decoupled.

Thus, the differential expansions that occur in the heat exchanger, because of the temperature difference between the center of the heat exchanger that is very hot because it is close to the cell and the periphery of the heat exchanger that is cooled, does not lead to high levels of mechanical stress in the structure of the heat exchanger since the parts forming the flow circuits 111 and 112 are not fastened together.

The parts 119, 120, and 121, and in particular their portions extending along the axis of revolution of the heat exchanger to form the walls of the flow circuit ducts 111 and 112 can expand freely, in particular in the axial direction. By leaving clearance between the part 119 and the free ends 120a and 121a respectively of the parts 120 and 121, and also clearance between the part 119 and the surrounding elements of the device 100, expansion can take place without interaction between the parts.

The central recess of the part 119 is closed at its top end by a cone 119a that provides sealing between the flow circuits 111 and 112 and serves to guide the preheated cool air stream 113 towards the preheated cool air outlet 116.

Figure 4A:
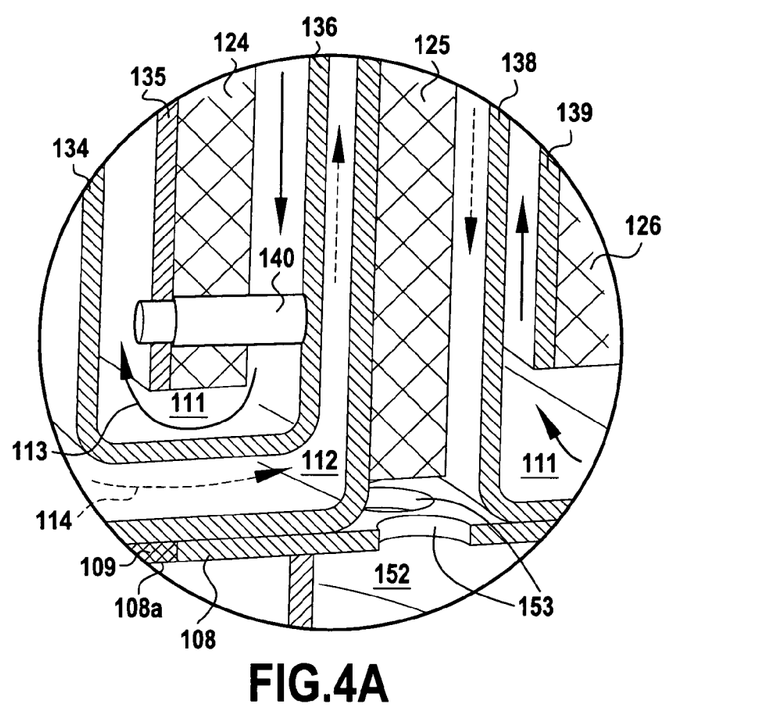
FIGS. 4A and 4B are detail views of the FIG. 4 fuel cell device.
Figure 4B:
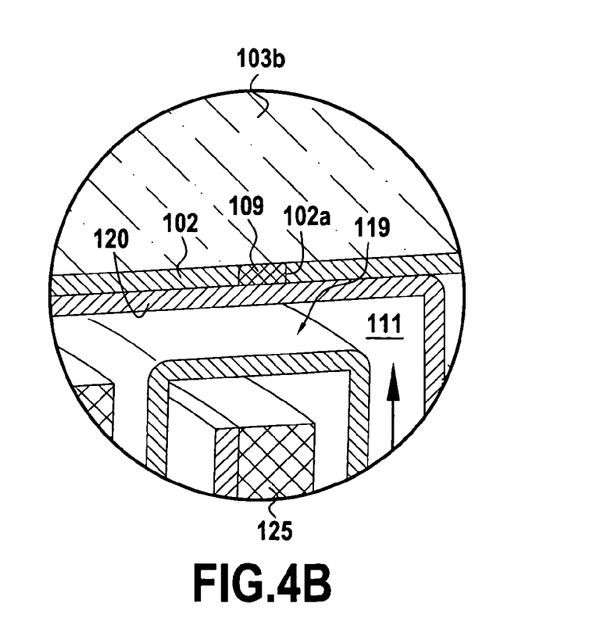

By way of example, the parts 120 and 121 are fastened respectively to the annular plate 108 and to the cover plate 102 by "plug" welding, i.e. by filling orifices 102a and 108a formed at regular spacing in the plate 102 and the plate 108 with spots of welding 109 (FIGS. 4A and 4B).

As shown in FIG. 4, the heat exchanger 110 presents, in the radial direction, an alternating succession of two annular ducts belonging to the first flow circuit 111 for the cool air stream 113 and two annular ducts belonging to the second flow circuit 112 for the depleted air stream 114.

Consequently, the same flow, i.e. the cool air flow 113 or the depleted air flow 114 flows on either side of a given wall when flowing in two adjacent annular ducts. Under such circumstances, in order to avoid heat losses within the heat exchanger, insulating layers 122 to 126 are fastened respectively on one side of each of the walls 131, 133, 135, 137, and 139. These insulating layers prevent heat losses in a given stream in its go-and-return travel along a wall, which losses could lead to thermal blockage in the heat exchanger. Heat exchange between the cool air stream 113 for preheating and the depleted air stream 114 for cooling is thus encouraged by insulating adjacent ducts in each flow circuit 111 and 112. Each of the insulating layers 122 to 125 may be formed by a layer of insulating foam and a film of quartz bonded onto the wall of the duct for insulating by means of an adhesive such as Fixwool® from the supplier Unifrax. A collar may also be placed at the end of the wall to ensure the insulation is kept in place around it.

In order to maintain spacing between the walls of the duct that are mechanically decoupled, it is possible to place spacer studs or spacers between the walls of the ducts. More precisely, as shown in FIG. 4A, series of spacer studs 140 can be distributed angularly between the walls of the ducts 1111, 1121, 1113, 1123, and 1115. The spacer studs are preferably placed in the vicinity of the free ends of the walls of each duct.

Figure 5:
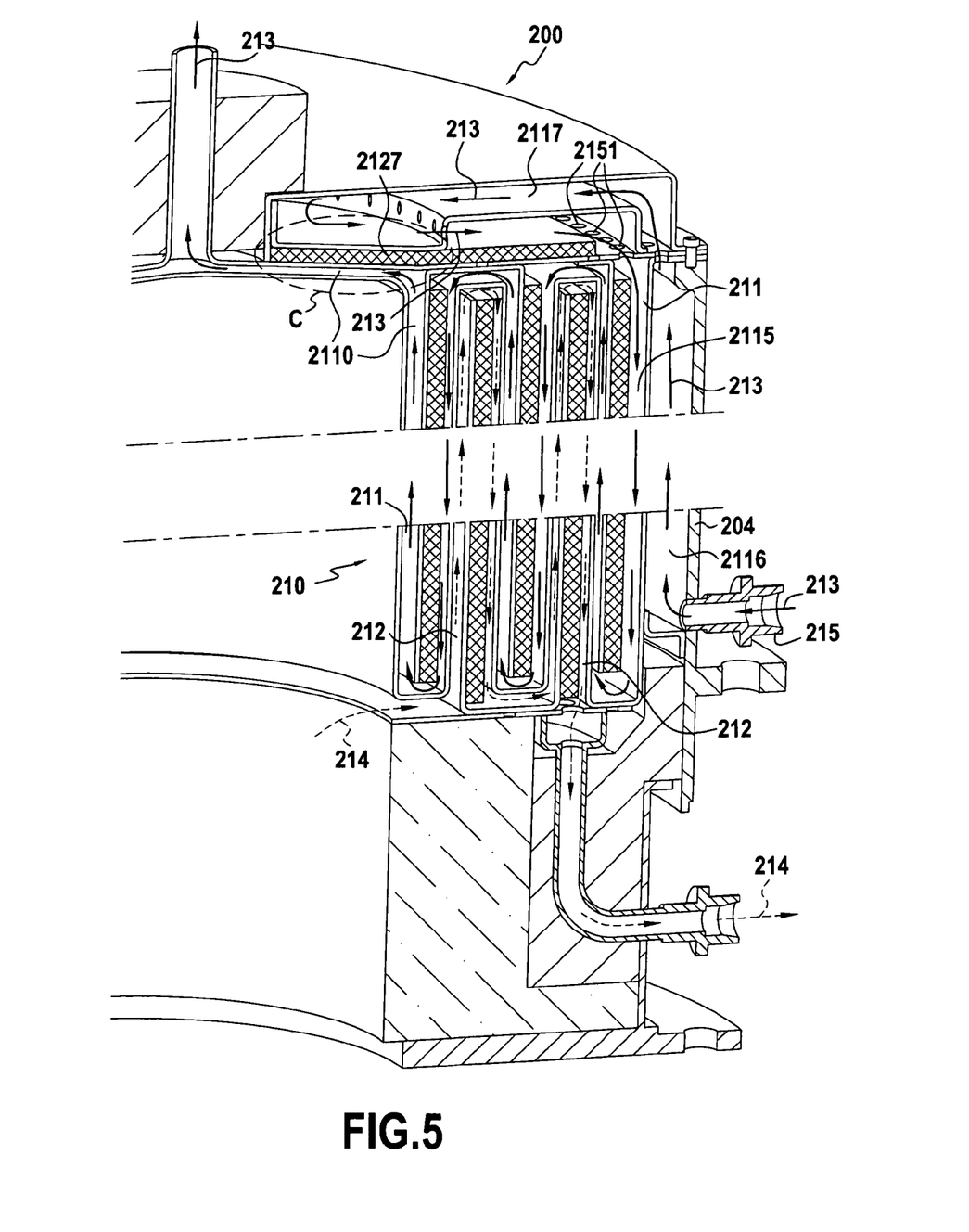
FIG. 5 is a perspective view of another embodiment of a fuel cell device incorporating a heat exchanger in accordance with the invention.

In the embodiment shown in FIGS. 1 to 4, the thermal insulation between the heat exchanger of the device and the outside is provided by an insulating cover 103 that comprises firstly a first layer of thermal insulation material 103a placed between the casing 104 and the heat exchanger 110, and secondly a second layer of thermal insulation material 103b. FIG. 5 shows another embodiment of the fuel cell device 200 that differs from that of FIG. 1 wherein the thermal insulation relative to the outside is provided by a flow of cold air taking the place of the insulating cover 103. More precisely, as shown in FIG. 5, the flow circuit 211 that serves to preheat the cool air stream 213 from the hot depleted air stream 214 coming from the cell and flowing through the flow circuit 212 is extended at its inlet by two additional ducts 2116 and 2117. The duct 2116 that co-operates with the cool air inlet 215 of the flow circuit 211 extends over the entire outer periphery of the heat exchanger 210 and, by passing the cool air flow 213, it serves to form a cooled outer wall so as to keep the casing 204 at a temperature that is low enough to avoid any risk of burns on being touched. The duct 2116 thus performs the insulation function that is performed by the first insulation 103a in the embodiment of FIG. 1. The duct 2117 passes a flow of cool air 213 over the top portion of the heat exchanger, thereby cooling it and providing the thermal insulation function that is performed by the annular second insulation 103b in the embodiment of FIG. 1. The duct 2117 opens out into the duct 2115 of the flow circuit 211 that corresponds to the duct 1115 of the flow circuit 111 of the FIG. 1 heat exchanger.

Nevertheless, in this embodiment, the duct 2117 in which the cool air stream 213 flows at its lowest temperature (i.e. before being heated in the heat exchanger) is very close to the duct 2110 in which the same cool air stream 213 flows but at its highest temperature (i.e. after being heated in the heat exchanger). Consequently, there exists a critical zone C in which there can be a considerable heat bridge between the heated air leaving the heat exchanger and the cool air that has just been fed into the heat exchanger. For this purpose, the heat exchanger 200 further includes a thermal insulation layer 2127 that serves at least to provide thermal decoupling between the duct 2117 and the duct 2110. As shown in FIG. 5, the insulating layer 2127 may be extended to the vicinity of the perforations 2151 that serve to deliver the cool air stream 213 into the first duct 2115 of the flow circuit 211.

The other elements of the heat exchanger 210 are structurally and functionally identical to those described above with reference to the device of FIG. 1.

Depending on requirements, the performance of the heat exchanger of the invention can easily be adapted. Its performance can be adjusted by varying the length of the heat exchange circuit by lengthening or shortening the flow circuit duct and/or by increasing or reducing the number of flow circuit ducts.

What is claimed is:

1. A heat exchanger comprising a first flow circuit for receiving a cold fluid and a second flow circuit for receiving a hot fluid, the first and second flow circuits having common surfaces for heat exchange, the first and second flow circuits each comprising a plurality of interconnected concentric annular ducts each annular duct having a corresponding first wall and corresponding opposing, second wall, the first and second walls of each annular duct lacking a mechanical coupling to each other;

the heat exchanger presenting pairs of adjacent annular ducts belonging to the first flow circuit for the cold fluid successively alternating with pairs of adjacent annular ducts belonging to the second flow circuit for the hot fluid, each pair of adjacent annular ducts belonging to the first or second flow circuit forming a distribution baffle and having a layer of thermal insulation between each of the annular ducts of the pair.

2. A heat exchanger according to claim 1, wherein one of the first and second walls of each annular duct includes a free end.

3. A heat exchanger according to claim 1, including spacer studs disposed between the walls of the annular ducts of the first and second flow circuits.

4. A heat exchanger according to claim 1, including a first layer of thermal insulation material placed around an outer periphery of said heat exchanger and a second layer of thermal insulation material placed on a top portion of said heat exchanger.

5. A heat exchanger according to claim 1, including a first duct extending over an entire outer periphery of said heat exchanger, and a second duct extending substantially over a top portion of said heat exchanger so as to form a cooling circuit around said heat exchanger.

6. A heat exchanger according to claim 1, wherein each of said first and second flow circuits has a length that is a function of at least one of the number and the height of the annular ducts.

7. A fuel cell device comprising:

a solid oxide fuel cell; and a heat exchanger according to claim 1, said heat exchanger including a central recess in which said cell is placed, the first flow circuit of said heat exchanger being suitable for feeding the fuel cell with a flow of preheated cool air, and the second flow circuit of said heat exchanger being suitable for exhausting a flow of hot depleted air coming from the fuel cell, the cool air stream being preheated by exchanging heat with the depleted air stream in said heat exchanger.

* * * * *